United States Patent
Ling et al.

(10) Patent No.: US 10,693,695 B2
(45) Date of Patent: *Jun. 23, 2020

(54) PEAK TO AVERAGE POWER RATIO SUPPRESSION

(71) Applicant: Maxlinear, Inc., Carlsbad, CA (US)

(72) Inventors: Curtis Ling, Carlsbad, CA (US); Tim Gallagher, Carlsbad, CA (US); Elad Shaked, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,637

(22) Filed: Feb. 14, 2018

(65) Prior Publication Data

US 2018/0176060 A1    Jun. 21, 2018

Related U.S. Application Data

(63) Continuation of application No. 15/257,135, filed on Sep. 6, 2016, now Pat. No. 9,900,200, which is a continuation of application No. 14/809,130, filed on Jul. 24, 2015, now Pat. No. 9,438,457, which is a continuation-in-part of application No. 14/224,123, filed on Mar. 25, 2014, now Pat. No. 9,094,269.

(60) Provisional application No. 61/805,013, filed on Mar. 25, 2013.

(51) Int. Cl.
  *H04L 27/26*  (2006.01)
  *H04J 11/00*  (2006.01)

(52) U.S. Cl.
  CPC ...... *H04L 27/2614* (2013.01); *H04L 27/2627* (2013.01); *H04J 2011/0009* (2013.01)

(58) Field of Classification Search
  CPC ............. H04L 27/2614; H04L 27/2615; H04L 27/2618; H04L 27/2621
  See application file for complete search history.

(56) References Cited

U.S. PATENT DOCUMENTS

| | | |
|---|---|---|
| 8,787,873 B1 | 7/2014 | Hitt |
| 2001/0036151 A1 | 11/2001 | Cimini et al. |
| 2002/0172184 A1 | 11/2002 | Kim |

(Continued)

*Primary Examiner* — Aristocratis Fotakis
(74) *Attorney, Agent, or Firm* — McAndrews, Held & Malloy, Ltd.

(57) ABSTRACT

A transmitter comprises a first peak-to-average-power ratio (PAPR) suppression circuit and a second peak-to-average-power ratio (PAPR) suppression circuit. The first PAPR suppression circuit may receive a first sequence of time-domain symbols to be transmitted, alter the first sequence based on each of a plurality of symbol ordering and/or inversion descriptors to generate a corresponding plurality of second sequences of time-domain symbols, measure a PAPR corresponding to each of the second sequences, select one of the plurality of symbol ordering and/or inversion descriptors based on the measurement of PAPR, and convey the selected one of the symbol ordering and/or inversion descriptors to the second PAPR suppression circuit. The second PAPR suppression circuit may receive the first sequence of time-domain symbols to be transmitted, and alter the first sequence based on the selected one of the symbol ordering and/or inversion descriptors to generate a reordered and/or inverted symbol sequence.

14 Claims, 19 Drawing Sheets

(56) References Cited

U.S. PATENT DOCUMENTS

| | | |
|---|---|---|
| 2004/0086054 A1 | 5/2004 | Corral |
| 2004/0146115 A1 | 7/2004 | Feng |
| 2005/0063485 A1* | 3/2005 | Hasegawa ............... H04B 1/707 |
| | | 375/296 |
| 2005/0238110 A1 | 10/2005 | Yun |
| 2005/0265226 A1 | 12/2005 | Shen |
| 2005/0265468 A1 | 12/2005 | Fujii |
| 2006/0189282 A1* | 8/2006 | Hasegawa ............ H04L 27/2614 |
| | | 455/127.1 |
| 2007/0098094 A1 | 5/2007 | Yue |
| 2007/0201582 A1* | 8/2007 | Okada ........................ H04L 5/06 |
| | | 375/308 |
| 2007/0217329 A1 | 9/2007 | Abedi |
| 2008/0285673 A1 | 11/2008 | Han |
| 2009/0052577 A1 | 2/2009 | Wang |
| 2009/0245414 A1* | 10/2009 | Okada .................... H04B 1/707 |
| | | 375/295 |
| 2010/0177847 A1* | 7/2010 | Woodward .......... H04L 27/2614 |
| | | 375/296 |
| 2010/0329401 A1 | 12/2010 | Terry |
| 2011/0200129 A1 | 8/2011 | Hwang |
| 2011/0280189 A1* | 11/2011 | Tsuboi .................... H04L 5/001 |
| | | 370/328 |
| 2016/0050099 A1* | 2/2016 | Siohan ................ H04L 27/2614 |
| | | 375/295 |

* cited by examiner

US 10,693,695 B2

PEAK TO AVERAGE POWER RATIO SUPPRESSION

PRIORITY CLAIM

This application is a continuation of U.S. application Ser. No. 15/257,135 filed on Sep. 6, 2016, which is a continuation of U.S. application Ser. No. 14/809,130 filed on Jul. 24, 2015 (now U.S. Pat. No. 9,438,457) which is a continuation-in-part of U.S. application Ser. No. 14/224,123 filed Mar. 25, 2014 (now U.S. Pat. No. 9,094,269), which claims priority to the following application(s), each of which is hereby incorporated herein by reference:
U.S. provisional patent application 61/805,013 titled "Peak to Average Power Ratio Suppression" filed on Mar. 25, 2013.

TECHNICAL FIELD

Certain embodiments of the invention relate to electronic communications. More specifically, certain embodiments of the invention relate to a peak to average power ratio suppression.

BACKGROUND

High peak to average power ratios can have negative impacts on the cost and operation of electronic receivers. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for peak to average power ratio suppression, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
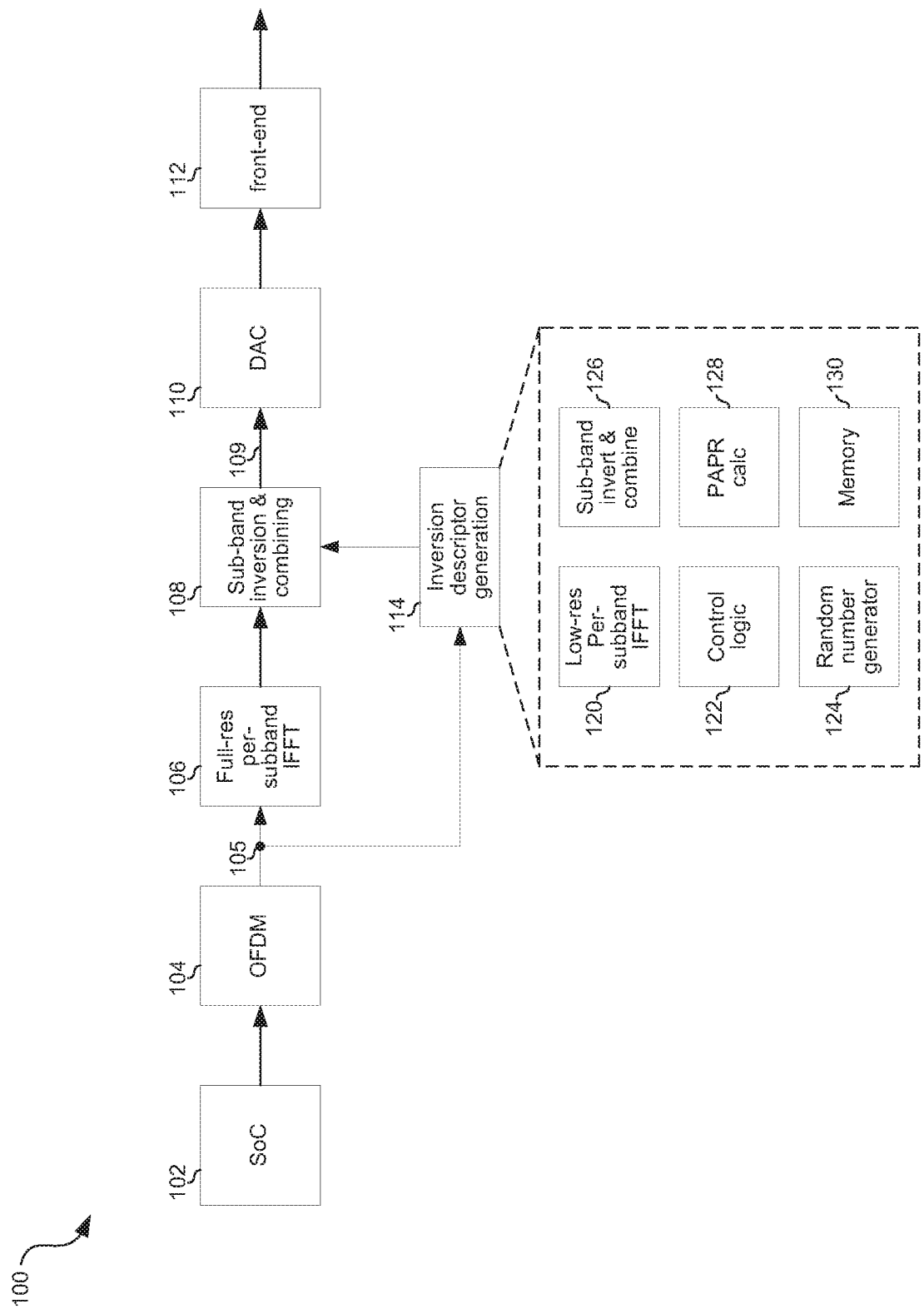
FIG. 1 is a diagram illustrating an example transmitter operable to perform peak to average power ratio (PAPR) suppression.

FIG. 1 is a diagram illustrating an example transmitter operable to perform peak to average power ratio (PAPR) suppression. The example transmitter comprises system on chip (SoC) 102, orthogonal frequency division multiplexing (OFDM) circuit 104, IFFT circuit 106, sub-band processing circuit 108, digital-to-analog converter (DAC) 110, front-end circuit (112), and inversion descriptor generation circuit 114. In the example implementation, the circuit 114 comprises an IFFT circuit 120, control logic circuit 122, random number generator circuit 124, sub-band inverting and combining circuit 126, PAPR calculation circuit 128, and memory 130.

A bitstream output by the system on chip (SoC) 102 is input to the OFDM circuit 104 which maps the bitstream to J*K QAM symbols corresponding to J*K OFDM subcarriers (a frequency-domain representation of an OFDM symbol). Along the main signal path (including 106, 108, 110, and 112), the subcarriers are grouped into K sub-bands of J subcarriers each. Each of the K sub-bands is input to IFFT circuit 106, which may perform a full-resolution (e.g., X bits) IFFT that operates on that sub-band. Thus, in an example implementation, the output of the IFFT 106 is K time-domain signals.

The sub-band processing circuit 108 may invert one or more of the K signals, and then sum the K signals (possibly with one or more of them having been inverted) such that the peak-to-average-power ratio (PAPR) of the summation is below a determined threshold. Which of the K signals are inverted by the circuit 108 may be dictated by an inversion descriptor generated by circuit 114.

The result of the summation may be output as signal 109, and may then be converted to analog by DAC 110 and, subsequently, processed (e.g., upconverted and amplified) by the front end circuit 112 for transmission onto a channel (wired, wireless, or optical).

Although, various implementations are described herein using J*K subcarriers uniformly distributed among K sub-bands, in other implementations the subcarriers may be non-uniformly distributed among the sub-bands (i.e., each of the K sub-bands may have any number of subcarriers which may be different from any other of the sub-bands). Furthermore, subcarriers grouped into a particular subband need not be adjacent to one another. For example, subcarriers that are spaced apart in frequency may be grouped into a common sub-band because the subcarriers share certain characteristics in the frequency domain and/or in the time domain.

Figure 2:
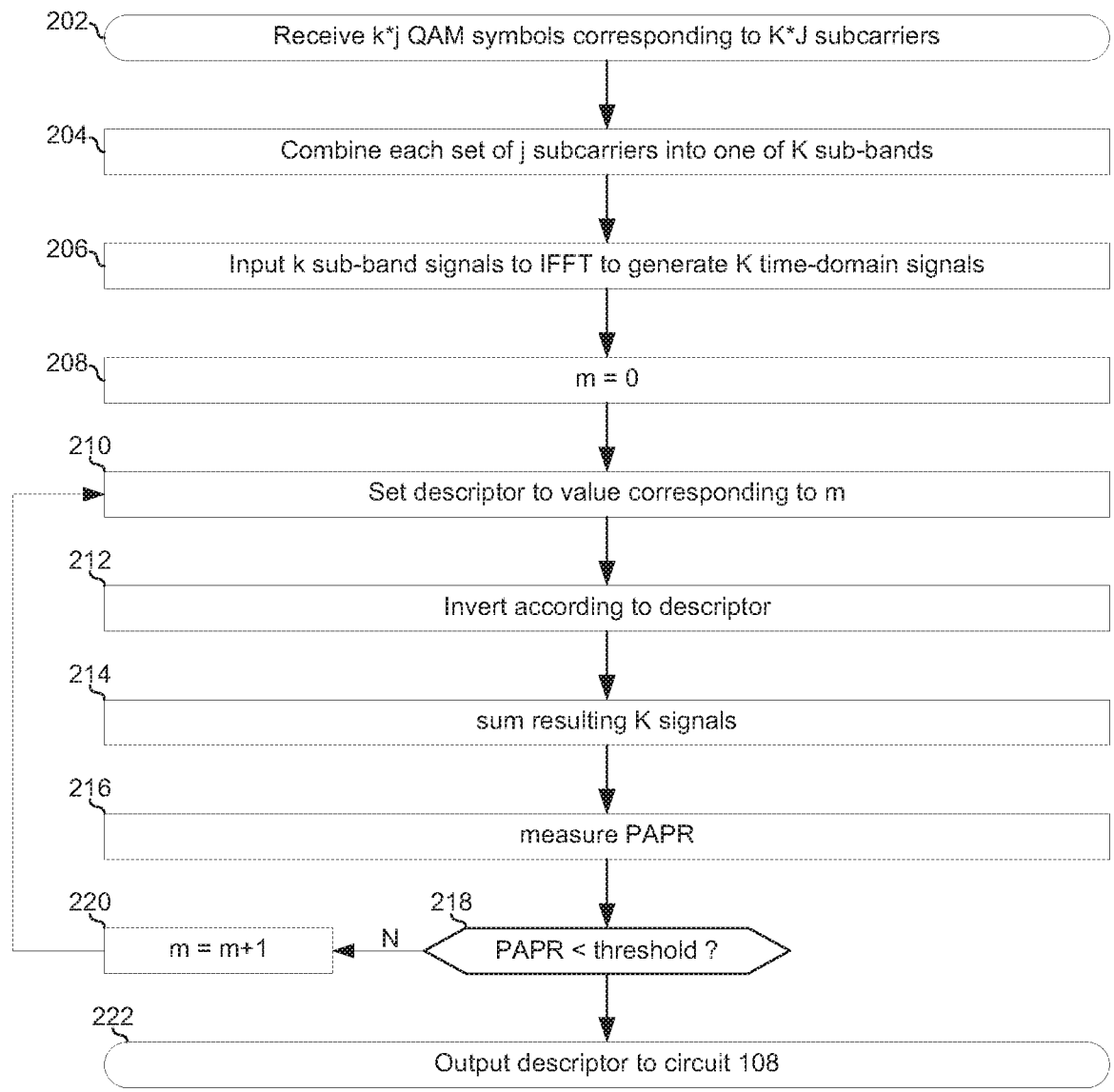
FIG. 2 is a flowchart illustrating an example process for PAPR suppression.

FIG. 2 is a flowchart illustrating an example process for PAPR suppression. The process begins with block 202 in which the inversion descriptor generation circuit 114 receives an OFDM symbol output by the OFDM circuit 104.

In block 204, the circuit 114 combines each set of J subcarriers into one of K sub-bands. In block 206, the IFFT circuit 120 generates K time-domain signals from the K sub-bands. In an example implementation, the IFFT 120 may operate similarly to the IFFT 106 but perhaps at a lower-resolution than the IFFT circuit 106 such that conversions performed by the IFFT circuit 106 are fast and/or consume less power than conversions performed by the IFFT 106. This may be acceptable because less precision is needed for the IFFT circuit 120 as compared to the IFFT circuit 106.

In block 208, a variable 'm' is initialized/reset (e.g., set to zero).

In block 210, a descriptor is generated based on the value of 'm.' In an example implementation, 'm' may be a seed value provided to random number generator circuit 124 such that the descriptor is a random value. In another implementation, the descriptor may be selected non-randomly based on information about the system (e.g., based on statistics collected based on previous descriptors used for previous OFDM symbols). In such an implementation 'm' may be, for example, an index of a look-up table.

In block 212, the circuit 126 inverts one or more of the K signals generated in block 206 according to the descriptor generated in block 210.

In block 214, the circuit 126 sums the K signals.

In block 216, the circuit 128 measures the PAPR of the sum generated in block 214.

In block 218, the control logic 122 determines whether the PAPR measured in block 216 is above a determined threshold. If not, the descriptor is output to circuit 108 to be used for processing the OFDM symbol. If so, then the process goes to block 220 where m is modified (e.g., incremented by 1 or a random value).

Figure 3:
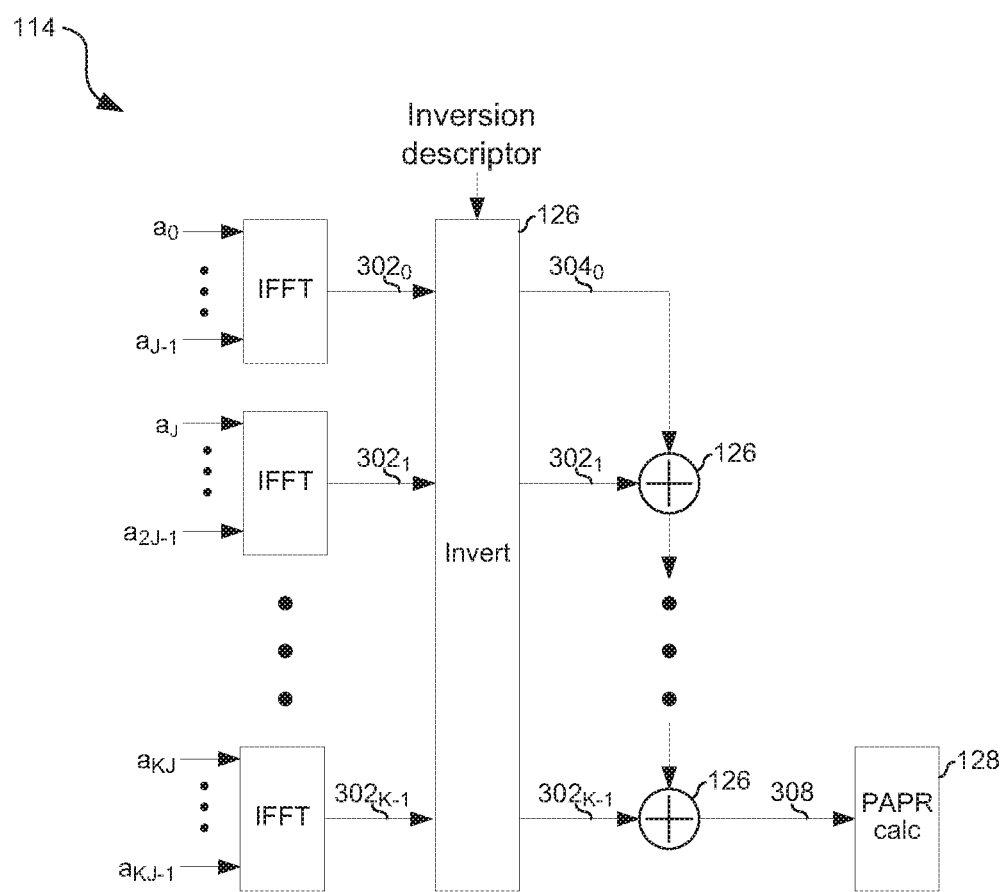
FIG. 3 is a diagram illustrating example circuitry of the transmitter of FIG.

FIG. 3 is a diagram illustrating example circuitry of the transmitter of FIG. 1. In FIG. 3, $a_0$ to $a_{kj-1}$ represent the K*J subcarrier values corresponding to the frequency domain representation of the OFDM symbol input to circuit 114. Each group of J subcarriers is converted to one of K time-domain signals $302_0$-$302_{K-1}$. One or more of the signals $302_0$-$302_{K-1}$ are then inverted according to the inversion descriptor. The resulting output is signals $304_0$-$304_{K-1}$, where each signal $304_k$ ($0 \le k \le K$) may be the same as, or inverted relative to, the corresponding signal $302_k$. The signals $304_0$-$304_{K-1}$ are summed via combining circuit 126, resulting in signal 308. Circuit 128 then calculates the PAPR of the sum signal 308. If the PAPR is too high, a different inversion descriptor is tried until a suitable one is found or until a timeout.

Figure 4:
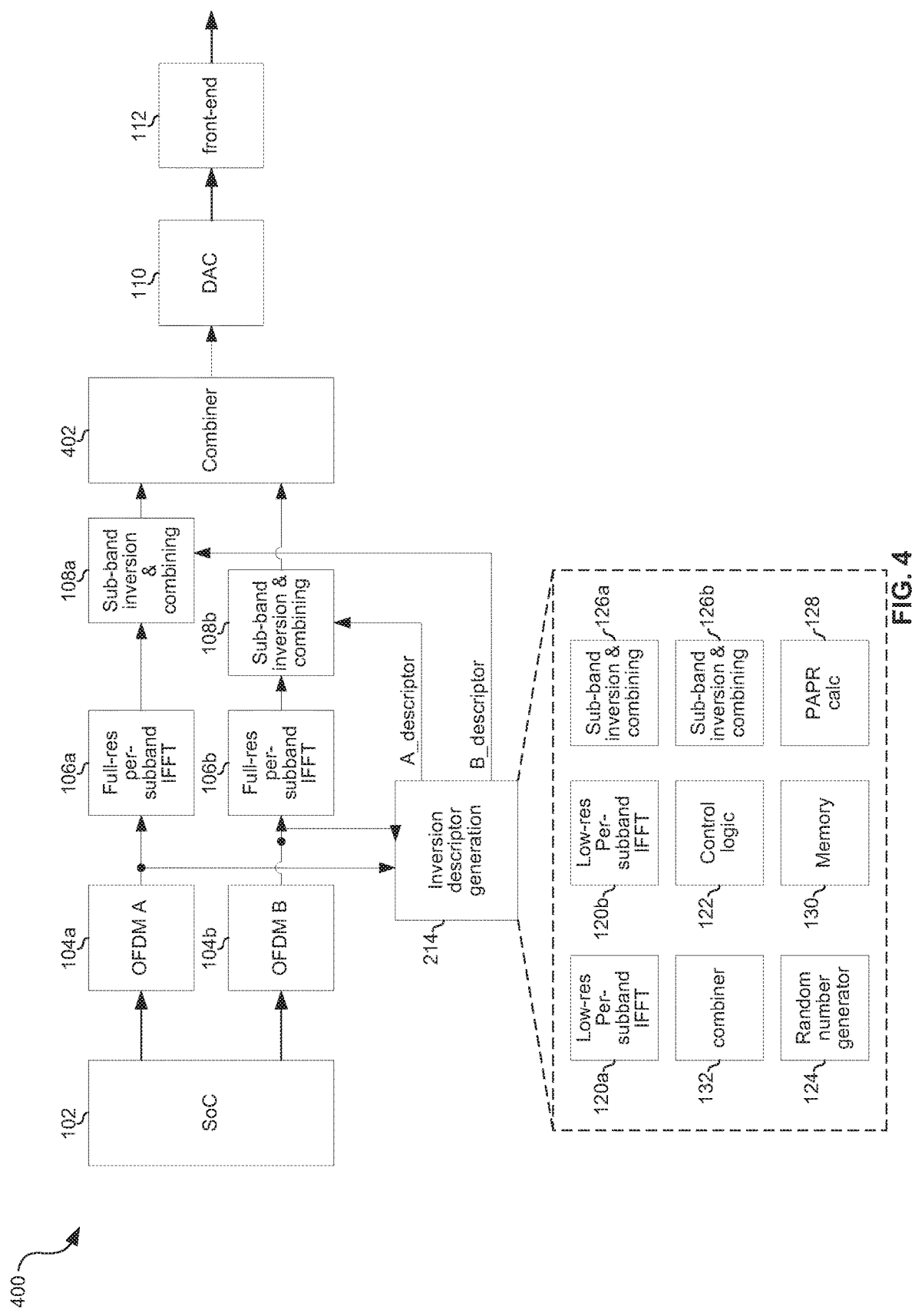
FIG. 4 is a diagram illustrating an example transmitter operable to perform PAPR suppression while concurrently generating and transmitting multiple OFDM symbols in parallel.

FIG. 4 is a diagram illustrating an example transmitter operable to perform PAPR suppression while concurrently generating and transmitting multiple OFDM symbols in parallel. The example transmitter 400 comprises the SoC 102, two instances of OFDM circuit 104 (labeled as 104a and 104b), two instances of IFFT circuit 106 (labeled as 106a and 106b), two instances of sub-band processing circuit 108 (labeled as 108a and 108b), a combiner circuit 402, the DAC 110, the front-end 112, and inversion descriptor generation circuit 214.

The inversion descriptor generation circuit 214 is similar to the circuit 114 but comprises two instances of IFFT circuit 120 (labeled 120a and 120b), two instances of inversion and combining circuit 126 (labeled 126a and 126b), a combiner 132, and is operable to generate multiple inversion descriptors corresponding to the multiple OFDM symbol paths. The two descriptors may, for example, be determined as described below in one or more of FIGS. 5A-8B.

Figure 5A:
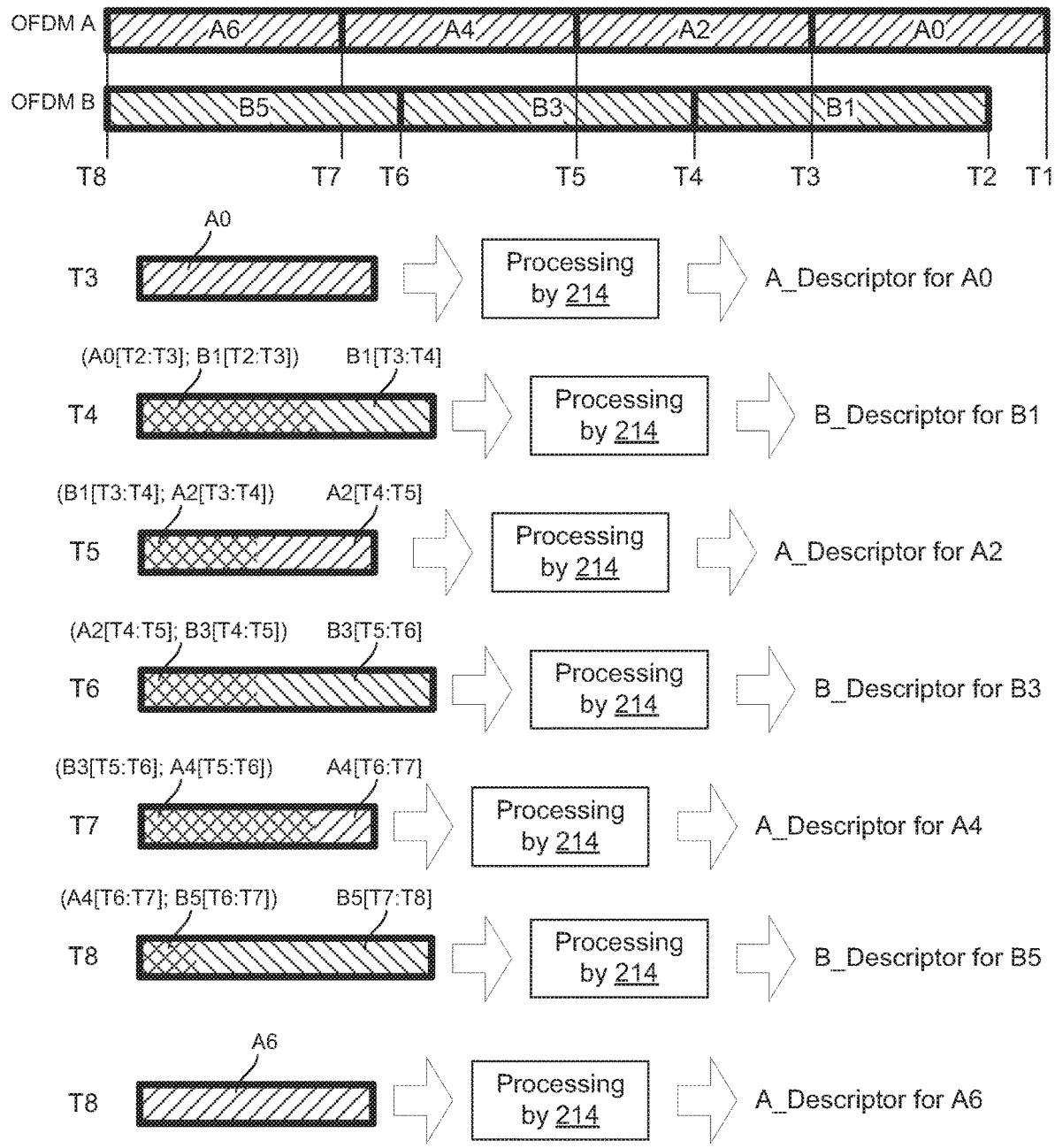
FIG. 5A is a diagram illustrating a first PAPR suppression technique for PAPR suppression of an example sequence of symbols generated by the transmitter of FIG. 4

FIG. 5A is a diagram illustrating a first PAPR suppression technique for PAPR suppression of an example sequence of symbols generated by the transmitter of FIG. 4. The symbol sequence comprises two parallel symbol streams from the circuits 104a and 104b. At time T3, the only symbol that has been received by circuit 214 is symbol A0, and the circuit 214 generates an A_descriptor value to be used for processing A0. At time T4, symbol B1 is received at circuit 214, the overlapping portions of A0 and B1 are combined (e.g., as shown in FIG. 5C), and then circuit 214 generates a B_descriptor value to be used for processing symbol B1. At time T5, symbol A2 is received at circuit 214, the overlapping portions of A2 and B1 are combined similar to how A0 and B1 were combined at time T4, and then the circuit 214 generates an A_descriptor value to be used for processing symbol A1. This process continues for the symbols B3, A4, B5, and A6 at times T5, T6, T7, and T8.

Figure 5B:
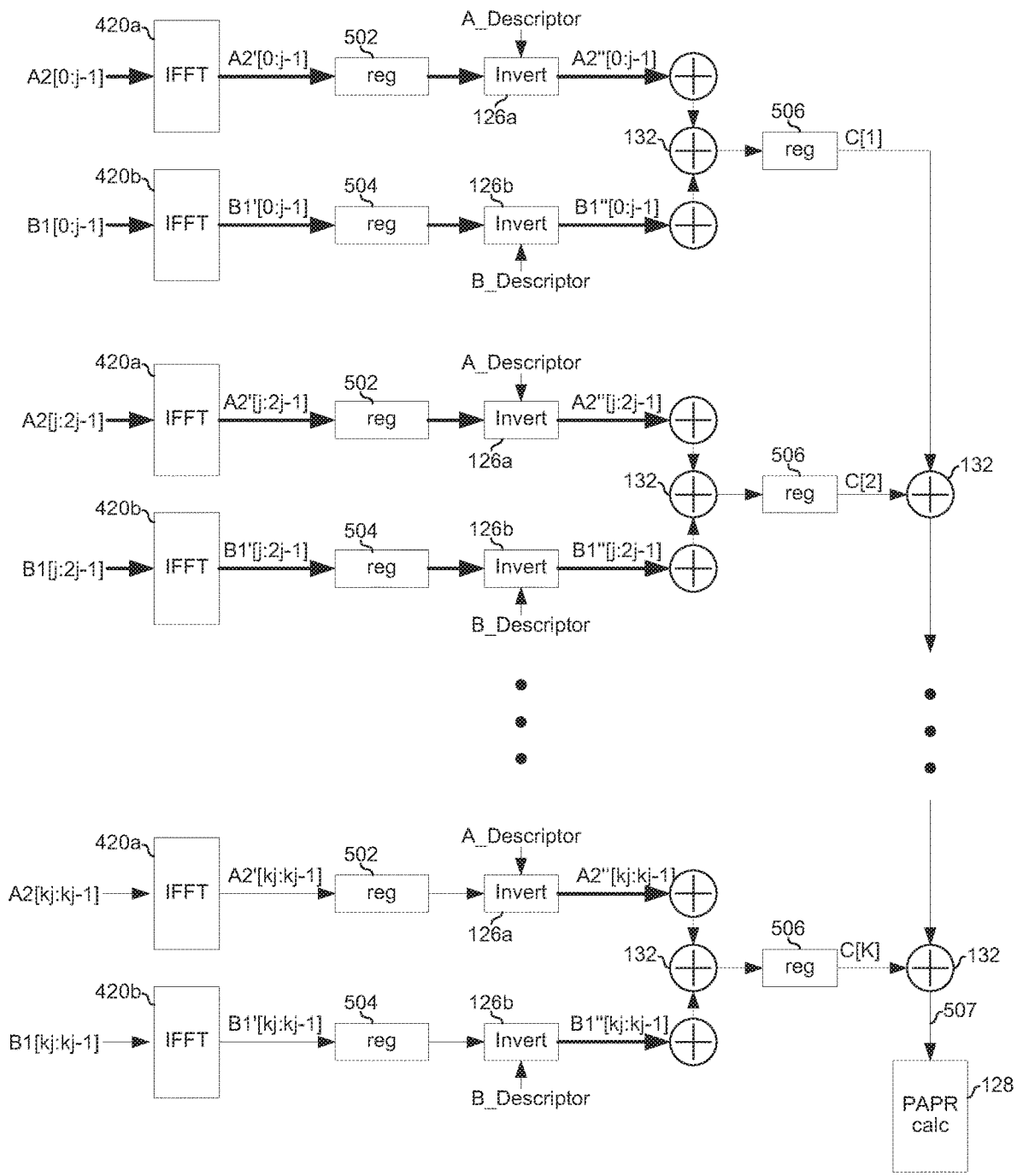
FIG. 5B is a diagram illustrating example circuitry of the transmitter of FIG. 4.
Figure 5C:
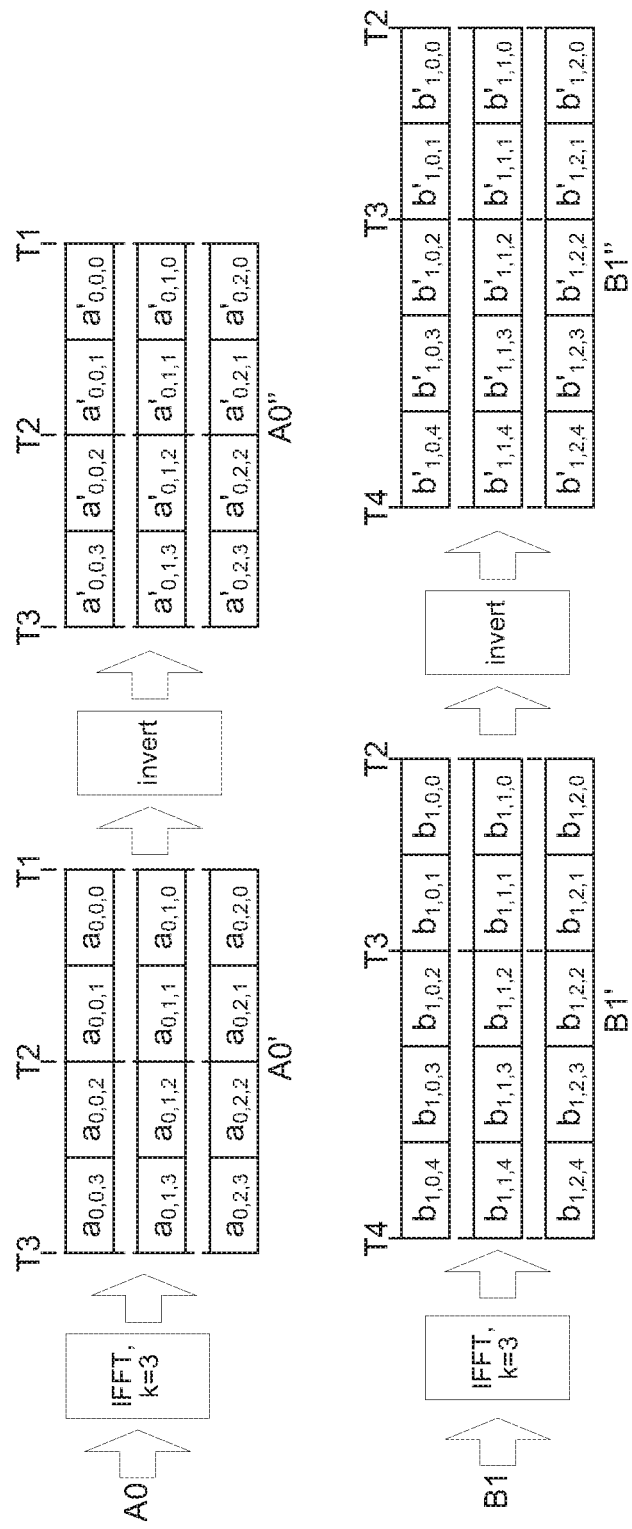
FIG. 5C is a diagram illustrating an example combining of time-overlapping symbols output by two OFDM circuits operating in parallel.

FIG. 5B is a diagram illustrating example circuitry of the transmitter of FIG. 4. When a symbol from 104A is ready, it is converted to a time-domain representation by circuit 420a and latched into a register 502 (e.g., part of memory 430). The most recently-received symbol, latched in a register 504 (e.g., part of memory 430), is shifted by the amount of time since it was received from 104B. The inversion descriptor previously determined for the most-recently-received symbol from 104B is applied, by circuit 108b, to the shifted symbol in register 504. Various values of A_Descriptor are then tried in combination with the previously-determined value of B_descriptor until PAPR below a threshold is achieved or a timeout occurs. That is, a first value of A_Descriptor is applied to the contents of register 502 via circuit 126A, the previously-determined value of B_Descriptor is applied, via circuit 126b, to the contents of register 504, then the outputs of 126a and 126b are combined via circuit 132 and register 506 to generate signals C[k] (0≤k≤K) which are then combined via circuit 132 to generate signal 507. The PAPR of signal 507 is then measured. If the PAPR of signal 507 is too high, then a different value of A_Descriptor is selected, and the process just described repeats. The process may repeat until a value of A_Descriptor that achieves PAPR is found or until a timeout occurs. If the timeout occurs, the A_descriptor that achieved the best PAPR of the ones tried may be selected for use. The generation of signal 507 for the example symbols A2 and B1 is further described below with reference to FIG. 5D

FIG. 5C is a diagram illustrating an example combining of time-overlapping symbols output by two OFDM circuits 104a and 104b operating in parallel. In FIG. 5C, A0 comprises four samples of each of three subcarriers, and B1 comprises five samples of each of three subcarriers (the first subscript indicates symbol index, the second subscript indicates subcarrier index, and the third subscript indicates sample index).

Figure 5D:
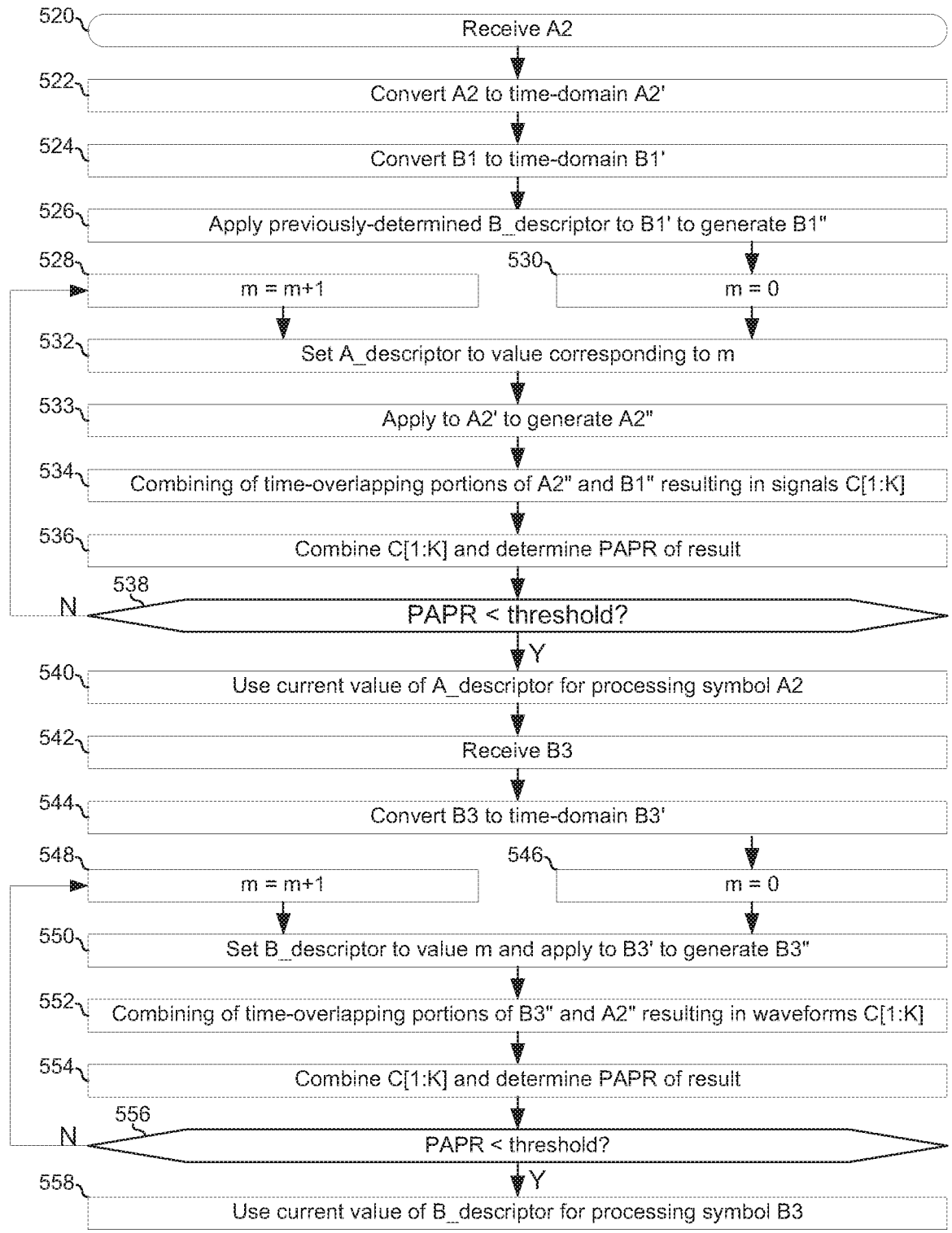
FIG. 5D is a flowchart describing operation of the first PAPR suppression technique for the symbols shown in FIG. 5A.

FIG. 5D is a flowchart describing operation of the first PAPR suppression technique for the example symbols shown in FIG. 5A. The process begins with block 520 in which symbol A2 (FIG. 5A) is received by circuit 214.

In block 522, IFFT circuit 120A converts A2 to time-domain representation A2'.

In block 524, IFFT circuit 120B converts B1 to time-domain representation B1'.

In block 526, a previously-determined (e.g., during an iteration of the process shown in FIG. 5D for symbol B1) B_Descriptor is applied to B1' to generate B1".

In block 530, a variable 'm' is initialized/reset (e.g., set to zero).

In block 532, A_Descriptor is set to a value that corresponds to m. For example, m may be a random seed fed to random number generator 124 or may be an index of a lookup table stored in memory 130.

In block 534, time-overlapping portions of A2" and B1" are combined resulting in signals C[1:K].

In block 536, the signals C[1:K] are combined to generate signal 507 and the PAPR of signal 507 is measured.

In block 538, it is determined whether the PAPR measured in block 536 is above a determined threshold. If not, the process proceeds to block 528, a new value of m is selected (e.g., m is incremented), and blocks 532 through 538 are repeated until the PAPR is below the threshold or a timeout. If the PAPR is below the threshold, then the process advances to block 540.

In block 540, the current value of A_Descriptor (determined in block 532) is used by IFFT circuit 108a for processing symbol A2.

In block 542, symbol B3 is received by circuit 214 from OFDM circuit 104b.

In block 544, IFFT circuit 120b converts B3' to time-domain representation B3".

In block 546, the variable 'm' is initialized/reset (e.g., set to zero).

In block 550, B_Descriptor is set to a value that corresponds to m. For example, m may be a random seed fed to random number generator 124 or may be an index of a lookup table stored in memory 130.

In block 552, time-overlapping portions of B3" and A2" are combined resulting in signals C[1:K].

In block 554, the signals C[1:K] are combined to generate signal 507 and the PAPR of signal 507 is measured.

In block 556, it is determined whether the PAPR measured in block 554 is above a determined threshold. If not, the process proceeds to block 548, a new value of m is selected (e.g., m is incremented), and blocks 532 through 538 are repeated until the PAPR is below the threshold or a timeout. If the PAPR is below the threshold, then the process advances to block 540.

In block 558, the current value of B_Descriptor (determined in block 532) is used by IFFT circuit 108a for processing symbol B3.

Figure 5E:
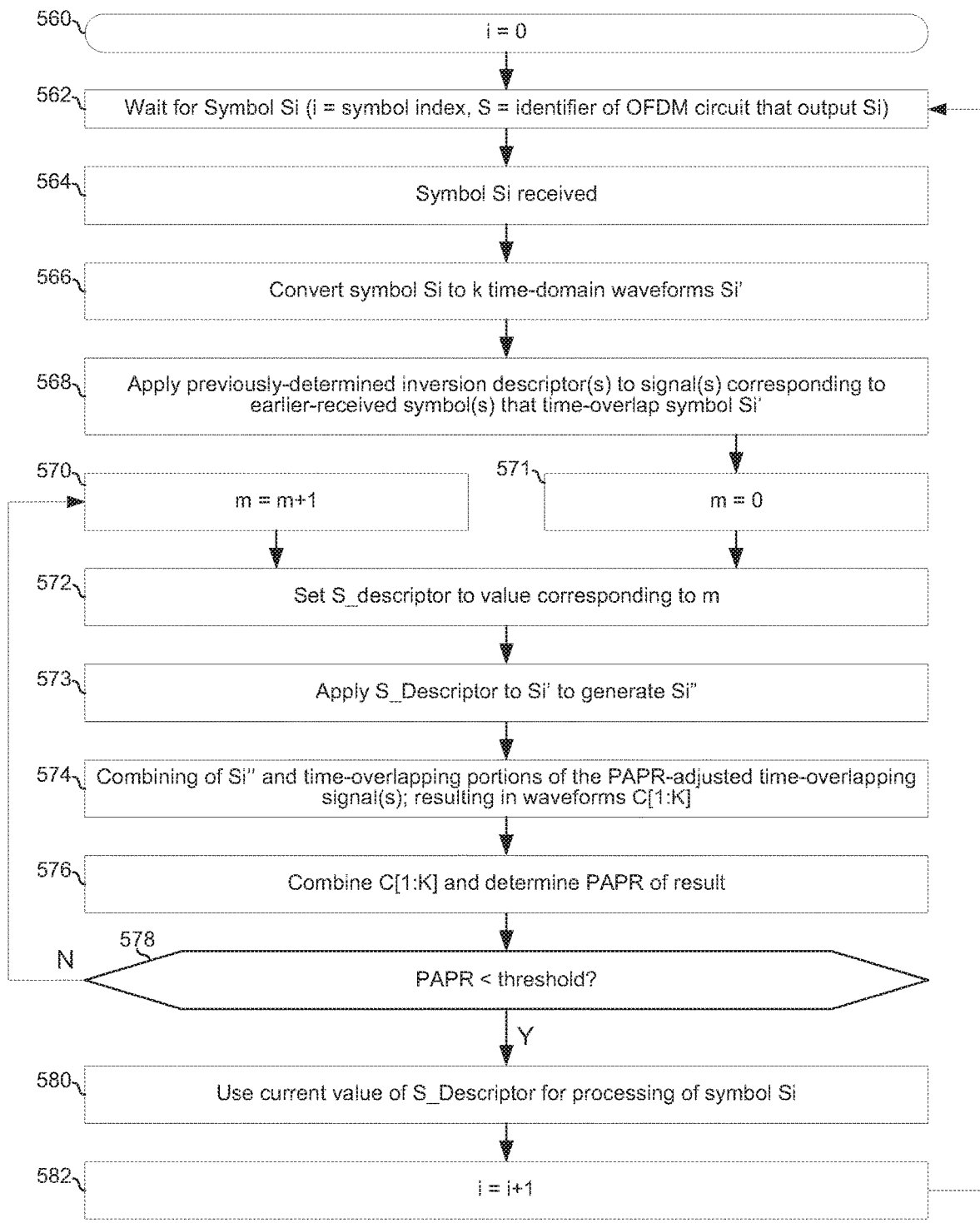
FIG. 5E is a flowchart describing a generalized version of the first PAPR suppression technique for PAPR suppression in systems having two or more OFDM circuits operating in parallel.

FIG. 5E is a generalized flowchart the first PAPR suppression technique for PAPR suppression in systems having two or more OFDM circuits operating in parallel. The process starts in block 560 where symbol index i is zero.

In block 562, the circuit 214 waits for Symbol Si, where S is the OFDM path identifier (e.g., A or B in FIG. 5A).

In block 564, symbol Si is received by circuit 214.

In block 566, Si is converted to time domain representation Si'.

In block 568, previously-determined inversion descriptor(s) are applied to signal(s) corresponding to earlier-received symbol(s) that time-overlap symbol Si' (if any such symbols exist).

In block 571, a variable 'm' is initialized/reset (e.g., set to zero).

In block 572, a value of S_Descriptor is set to a value corresponding to m.

In block 573, the value of S_Descriptor set in block 572 is used to process Si' to generate Si".

In block 574, Si" is combined with the time-overlapping portions of the time-overlapping symbols (if any). The combining results in signals C[1:K].

In block 576, the signals C[1:K] are combined to generate signal 507 and the PAPR of signal 507 is measured.

In block 578, it is determined whether the PAPR measured in block 576 is above a determined threshold. If not, the process proceeds to block 570, a new value of m is selected (e.g., m is incremented), and blocks 572 through 578 are repeated until the PAPR is below the threshold or a timeout. If the PAPR is below the threshold, then the process advances to block 580.

In block 580, the current value of S_Descriptor (determined in block 572) is used by IFFT circuit 108a for processing symbol Si.

In block 582, i increments and the process returns to block 562.

Figure 6A:
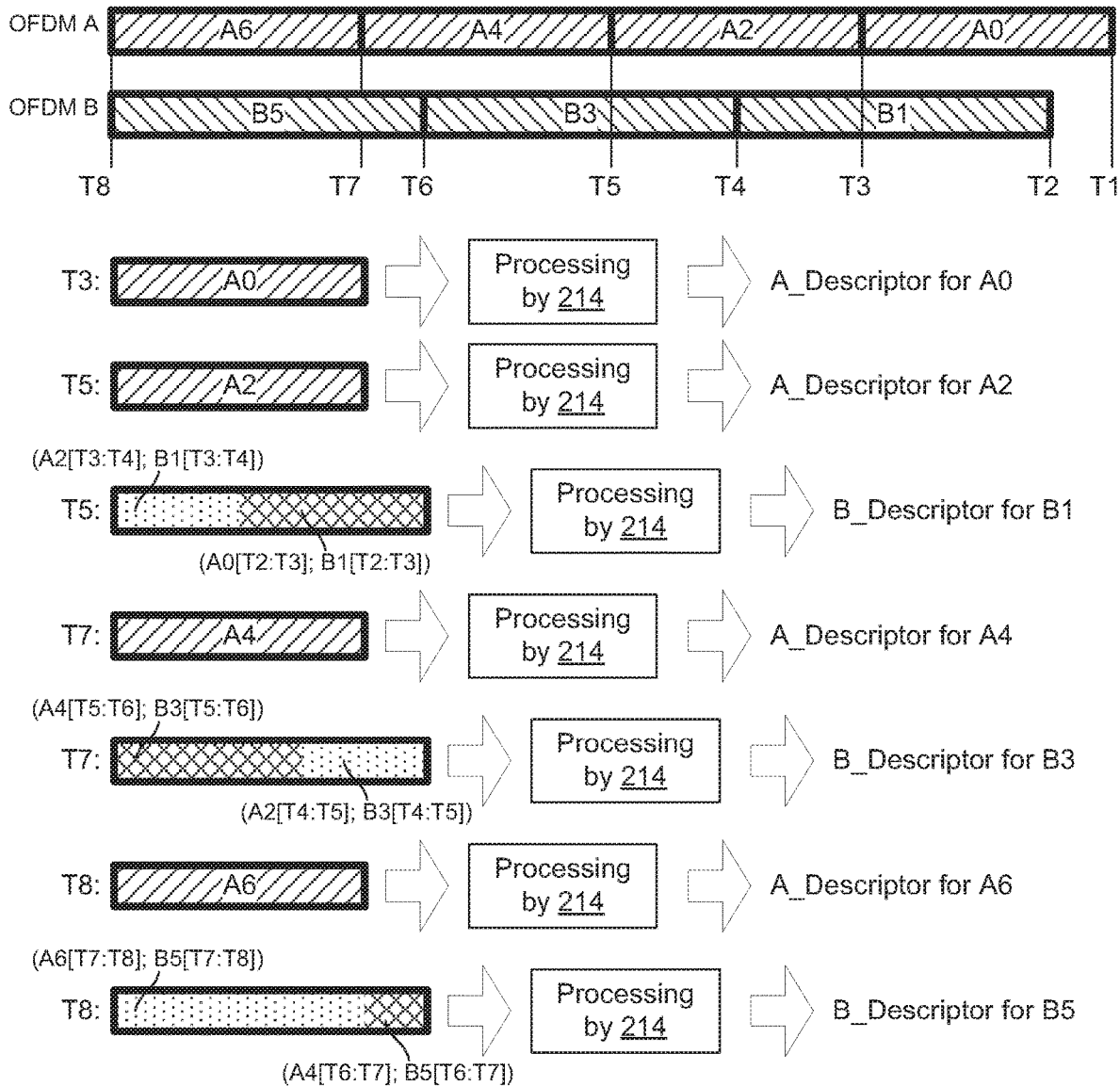
FIG. 6A is a diagram illustrating a second PAPR suppression technique for PAPR suppression of an example sequence of symbols generated by the transmitter of FIG. 4

FIG. 6A is a diagram illustrating a second PAPR suppression technique for PAPR suppression of an example sequence of symbols generated by the transmitter of FIG. 4. In FIG. 6A, symbols are buffered until all other time-overlapping symbols have been received, and then PAPR suppression is performed. Example operations using this technique are described in FIGS. 6B and 6C.

Figure 6B:
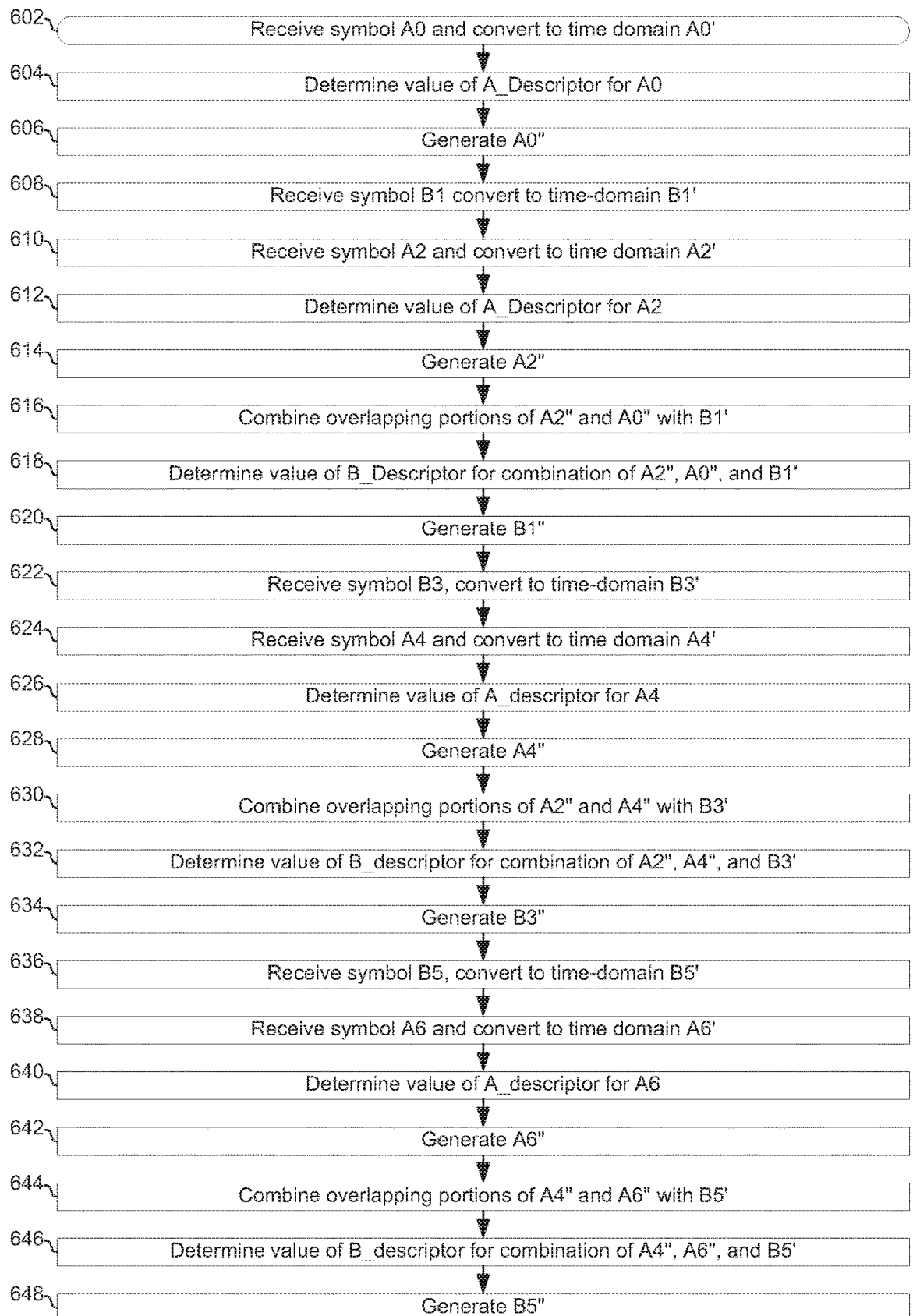
FIG. 6B is a flowchart describing operation of the second PAPR suppression technique for the symbols shown in FIG. 6A.

FIG. 6B is a flowchart describing operation of the second PAPR suppression technique for the symbols shown in FIG. 6A. The process begins with block 602 in which circuit 214 receive symbol A0 from OFDM circuit 104a and generates time domain representation A0' via circuit 120a.

In block 604, the circuit 214 iteratively determines a value of A_Descriptor for symbol A0 that achieves a PAPR below a determined threshold.

In block 606, the value of A_Descriptor determined in block 604 is used by circuit 108a for generating A0".

In block 608, circuit 214 receives symbol B1 from OFDM circuit 104b and generates time domain representation B1' via circuit 120b.

In block 610, circuit 214 receives symbol A2 from OFDM circuit 104a and generates time domain representation A2' via circuit 120a.

In block 612, the circuit 214 iteratively determines a value of A_Descriptor for symbol A2 that achieves a PAPR below a determined threshold.

In block 614, the value of A_Descriptor determined in block 612 is used by circuit 108a for generating A2".

In block 616, time-over-lapping portions of A0", A2", and B1' are combined.

In block 618, the circuit 214 iteratively determines a value of B_Descriptor that achieves a PAPR below a determined threshold for the combination generated in block 616.

In block 620, the value of B_Descriptor determined in block 612 is used by circuit 108b for generating B1".

In block 622, circuit 214 receives symbol B3 from OFDM circuit 104b and generates time domain representation B3' via circuit 120b.

In block 624, circuit 214 receives symbol A4 from OFDM circuit 104a and generates time domain representation A4" via circuit 120a.

In block 626, the circuit 214 iteratively determines a value of A_Descriptor that achieves a PAPR below a determined threshold for the symbol A4.

In block 628, the value of A_Descriptor determined in block 626 is used by circuit 108a for generating A4".

In block 630, time-over-lapping portions of A2", A4", and B3' are combined.

In block 632, the circuit 214 iteratively determines a value of B_Descriptor that achieves a PAPR below a determined threshold for the combination generated in block 630.

In block 634, the value of B_Descriptor determined in block 632 is used by circuit 108b for generating B3".

In block 636, circuit 214 receives symbol B5 from OFDM circuit 104b and generates time domain representation B5' via circuit 120b.

In block 638, circuit 214 receives symbol A6 from OFDM circuit 104a and generates time domain representation A6' via circuit 120a.

In block 640, the circuit 214 iteratively determines a value of A_Descriptor that achieves a PAPR below a determined threshold for A6.

In block 642, the value of A_Descriptor determined in block 640 is used by circuit 108a for generating A6".

In block 644, time-over-lapping portions of A4", A6", and B5' are combined.

In block 646, the circuit 214 iteratively determines a value of B_Descriptor that achieves a PAPR below a determined threshold for the combination generated in block 644.

In block 648, the value of B_Descriptor determined in block 646 is used by circuit 108b for generating B5".

Figure 6C:
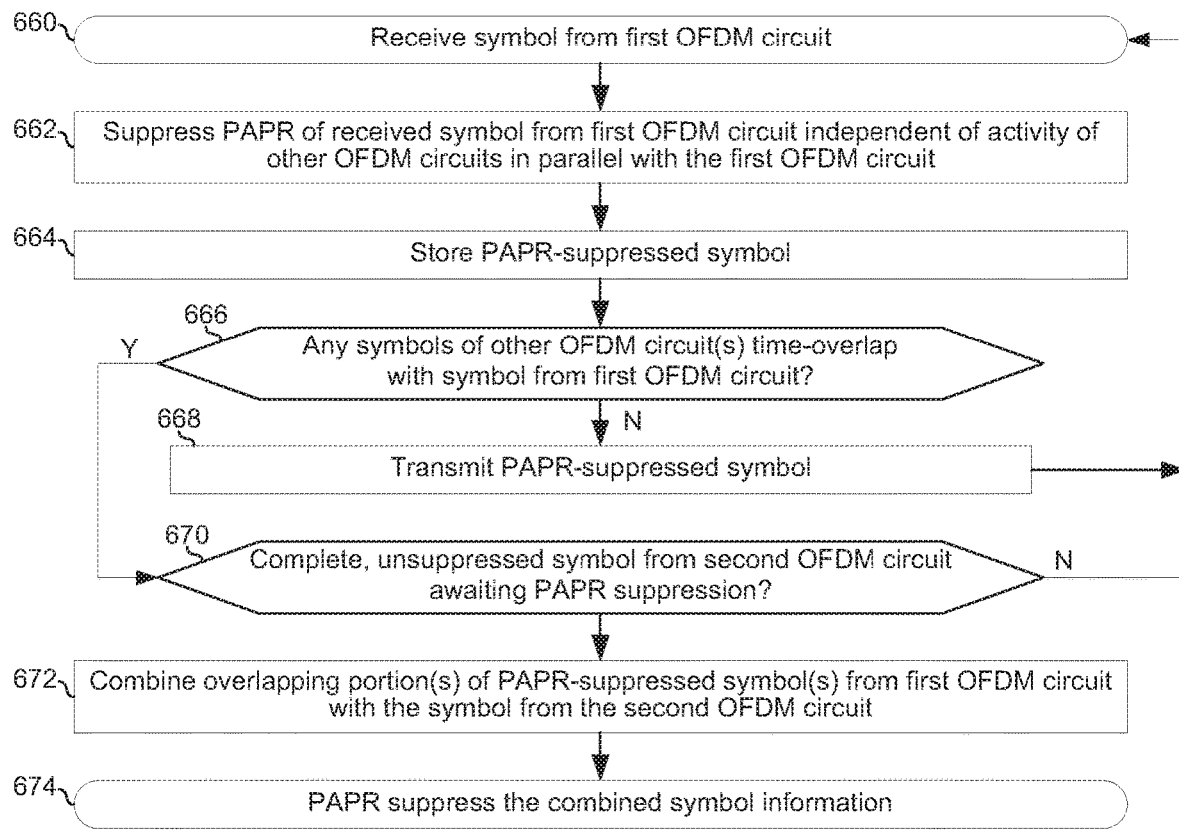
FIG. 6C is a flowchart describing a generalized version of the second PAPR suppression technique for PAPR suppression in systems having two or more OFDM circuits operating in parallel.

FIG. 6C is a flowchart describing a generalized version of the second PAPR suppression technique for PAPR suppression in systems having two or more OFDM circuits operating in parallel. The process begins in block 660 when circuit 214 receives a symbol from a first of multiple OFDM circuits (e.g., from 104a or 104b).

In block 662, a descriptor to sufficiently suppress PAPR of the symbol received in the most recent iteration of block 660 is determined without regard to whether any symbols from other OFDM circuit(s) overlap in time with it. The determined descriptor is then used by a respective one of multiple sub-band processing circuits to generate a PAPR-suppressed symbol.

In block 664, the PAPR-suppressed symbol generated in block 662 is stored in the transmitter (e.g., in memory 130).

In block 666, it is determined whether there are any symbols received or being received via a second of the OFDM circuits that time-overlap with the first symbol. If not, then in block 668 the PAPR suppressed symbol generated in block 664 is transmitted and the process returns to block 660. If so, then the process advances to block 670.

In block 670, it is determined whether the time-overlapping symbol(s) have been completely received via the second of the OFDM circuits. If the time-overlapping symbols have not yet been completely received, then the process returns to block 660. If the time-overlapping symbol(s) have been completely received, then the process advances to block 672.

In block 672, the PAPR-suppressed symbol generated in block 664 is combined with the over-lapping portions of the unsuppressed, time-overlapping symbol(s).

In block 674, a descriptor to sufficiently suppress PAPR of the combination of symbols generated in block 672 is determined. The determined descriptor is then used by respective one(s) of the multiple sub-band processing circuits to generate PAPR-suppressed symbol(s).

Figure 7:
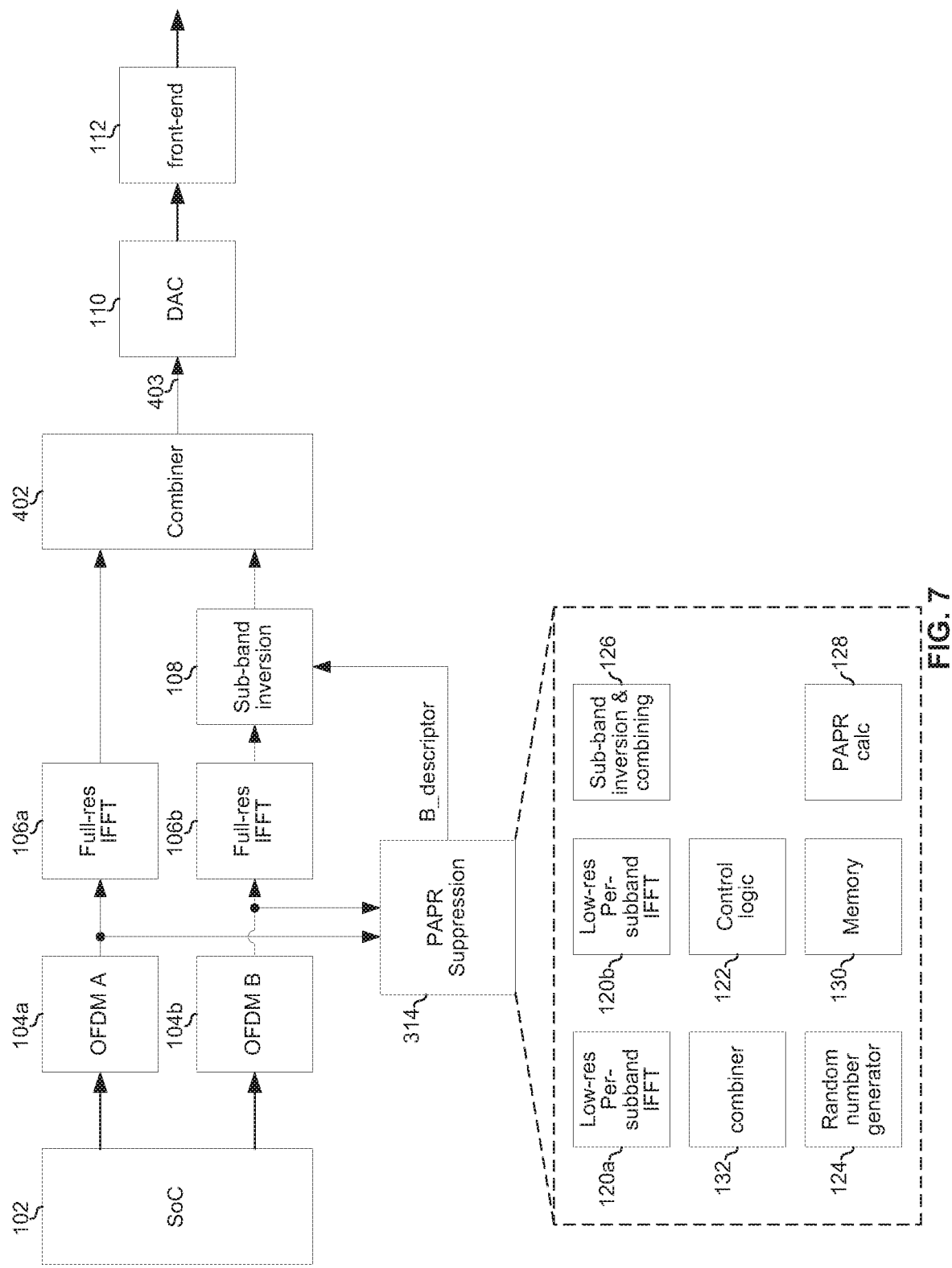
FIG. 7 is a diagram illustrating an example transmitter having two OFDM circuits generating two OFDM symbol streams in parallel and suppressing total PAPR by manipulating the second OFDM symbol stream.

FIG. 7 is a diagram illustrating an example transmitter having two OFDM circuits generating two OFDM symbol streams in parallel and suppressing total PAPR by manipulating the second OFDM symbol stream. In the transmitter of FIG. 7, the circuit 314 is similar to the circuit 214, but only generates one inversion descriptor. In this regard, applying the inversion to only one of the two OFDM symbol streams may sufficiently reduce the PAPR of the signal 403 output by the combiner 402.

Figure 8A:
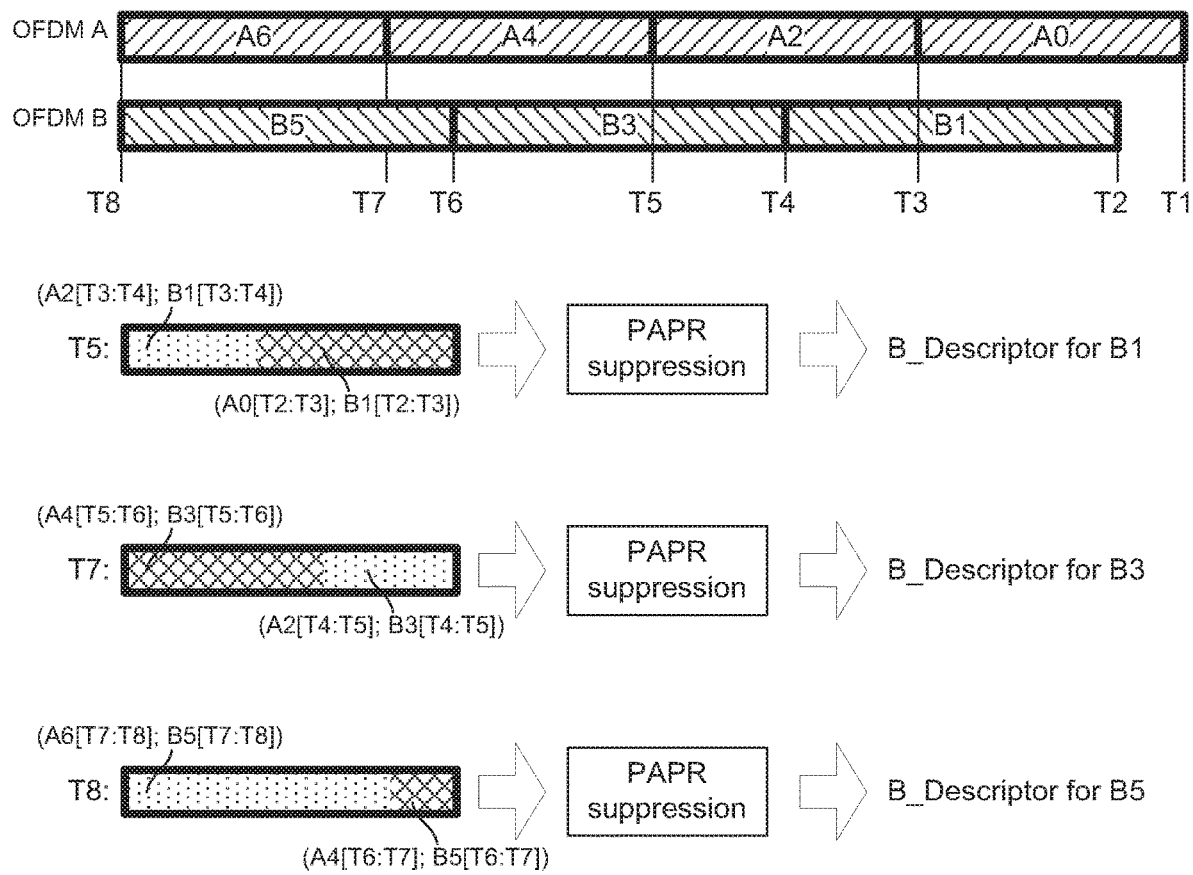
FIG. 8A is a diagram illustrating a third PAPR suppression technique for PAPR suppression of an example sequence of symbols generated by the transmitter of FIG. 7.

FIG. 8A is a diagram illustrating a third PAPR suppression technique for PAPR suppression of an example sequence of symbols generated by the transmitter of FIG. 7. Example operations using this technique are described in FIG. 8B.

Figure 8B:
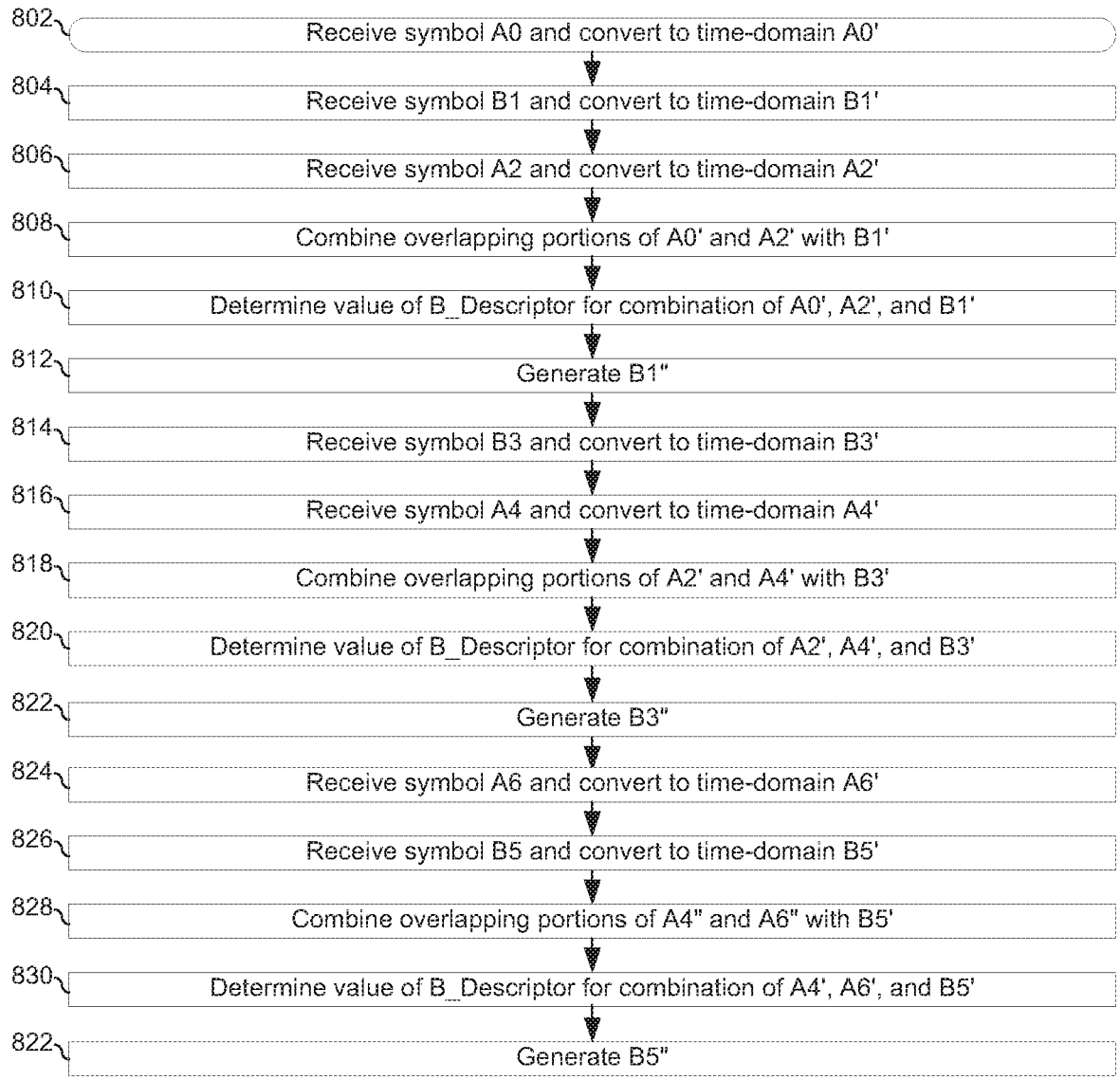
FIG. 8B is a flowchart describing operation of the third PAPR suppression technique for the symbols shown in FIG. 8A.

FIG. 8B is a flowchart describing operation of the third PAPR suppression technique for the symbols shown in FIG. 8A. The process begins in block 802 in which the circuit 214 receives symbol A0 and converts it to time-domain representation A0'.

In block 804, circuit 214 receives symbol B1 and converts it to time-domain representation B1'.

In block 806, circuit 214 receives symbol A2 and converts it to time-domain representation A2'.

In block 808, circuit 214 combines overlapping portions of A0', A2', and B1'.

In block 810, circuit 214 iteratively determines a value of B_Descriptor for the symbol combination generated in block 808.

In block 812, the descriptor determined in block 810 is used to generate B1".

In block 814, circuit 214 receives symbol B3 and converts it to time-domain representation B3'.

In block 816, circuit 214 receives symbol A4 and converts it to time-domain representation A4'.

In block 818, circuit 214 combines overlapping portions of A2', A4', and B3'.

In block 820, circuit 214 iteratively determines a value of B_Descriptor for the symbol combination generated in block 818.

In block 822, the descriptor determined in block 820 is used to generate B3".

In block 824, circuit 214 receives symbol A6 and converts it to time-domain representation A6'.

In block 826, circuit 214 receives symbol B5 and converts it to time-domain representation B5'.

In block 828, circuit 214 combines overlapping portions of A4', A6', and B5'.

In block 830, circuit 214 iteratively determines a value of B_Descriptor for the symbol combination generated in block 828.

In block 832, the descriptor determined in block 820 is used to generate B5".

Figure 9A:
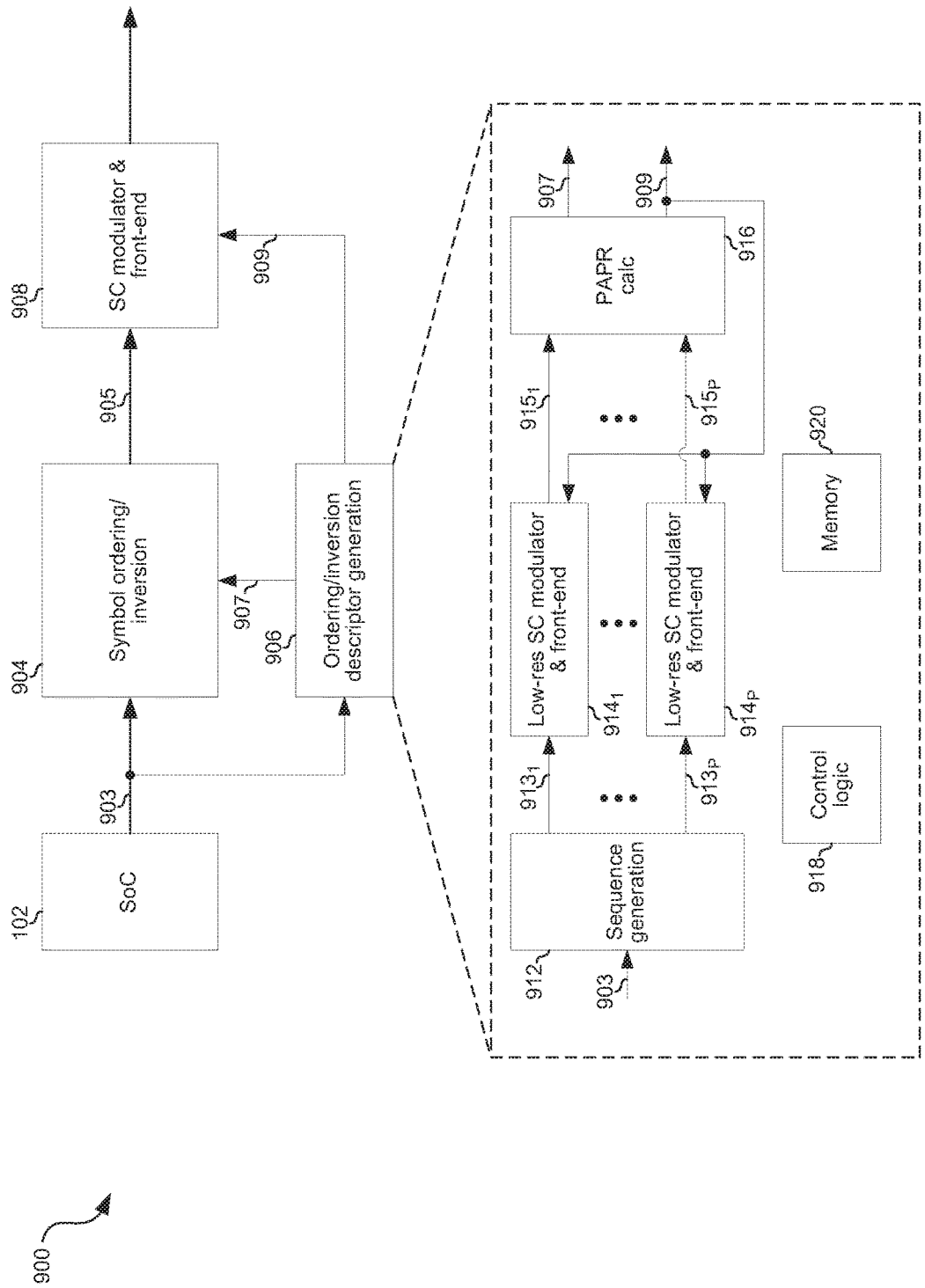
FIG. 9A is a diagram illustrating an example transmitter operable to perform peak to average power ratio (PAPR) suppression for single-carrier transmissions.

FIG. 9A is a diagram illustrating an example transmitter operable to perform peak to average power ratio (PAPR) suppression for single-carrier transmissions. Shown are the SoC 102, a symbol ordering and/or inverting circuit 904, an ordering and/or inversion descriptor generation circuit 906, and single-carrier modulator and front-end circuit 908. The ordering/inversion descriptor generation circuit 906 comprises a sequence generation circuit 912, low-cost single-carrier modulator and front-end circuits $914_1$-$914_M$, PAPR calculation circuit 916, control logic 918, and memory 920.

The sequence generation circuit 912 is operable to receive N (an integer) symbols of signal 903 and generate P (an integer between 1 and $S^N$, where S is the number of possible symbol values) sequences. The value of P for any particular implementation of transmitter 900 may be selected to balance size and power consumption and PAPR improvement (both of which increase as P increases). Each of the P sequences may be a different ordering of the N symbols, with each ordering corresponding to a particular descriptor value. Additionally, or alternatively, each of the P sequences may have a different subset of the N symbols inverted, with each combination of inverted and non-inverted symbols corresponding to a particular descriptor value. Inverting a symbol may correspond to applying a 180 degree phase shift to the symbol. In various implementations, however, a different known/deterministic phase shift may be applied to the subset of symbols that correspond to the particular descriptor to be used. In an implementation where $P<S^N$ (i.e., not every possibly sequence is tried), the P descriptor values may be chosen randomly. Alternatively, the P descriptor values may be chosen algorithmically based, for example, on characteristics of the current N symbols and/or the previous N symbols.

Each low-cost modulation and front-end circuit 913 may be a low-cost version of circuit 908. For example, each front-end circuit 913 may perform the same functions as circuit 908 but with lower resolution. As another example, each front-end circuit 913 may be structurally similar to circuit 908 but with less restrictive design and performance constraints which correspond to a lower cost component.

The PAPR calculation circuit 907 is operable to measure the PAPR of each of sequences $915_1$-$915_P$.

Figure 10A:
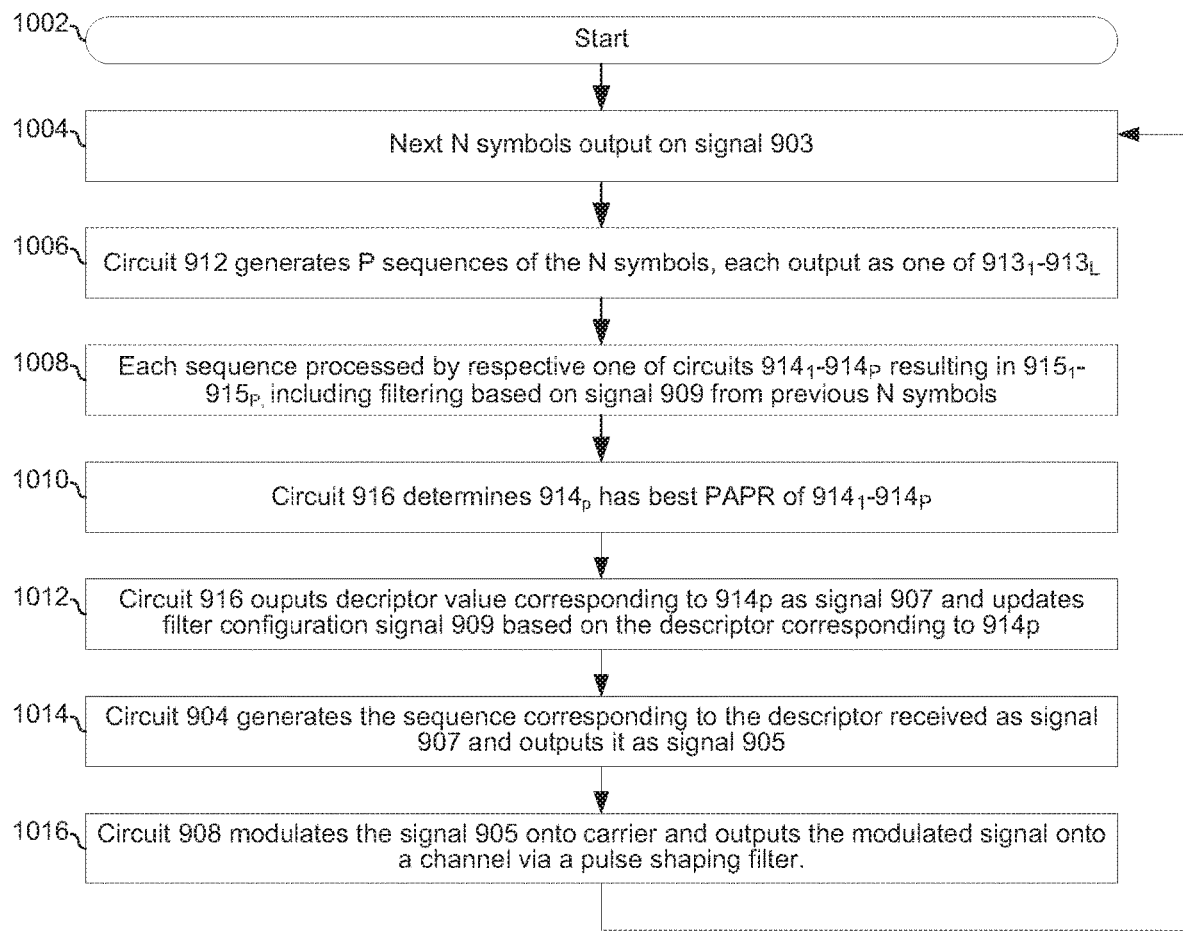
FIG. 10A is a flowchart illustrating operation of the transmitter of FIG. 9A.

Operation of the transmitter 900 is described with reference to the flowchart of FIG. 10A.

In block 1004, after start step 1002, N symbols are output by SOC 102 as signal 903.

In block 1006, Circuit 912 generates P sequences of the N symbols, each output as one of $913_1$-$913_L$.

In block 1008, each sequence output in block 1006 is processed by a respective one of circuits $914_1$-$914_P$. The processing in block 1008 may include, for example, upconversion and pulse shape filtering (e.g., using a root raised cosine filter) and result in signals $915_1$-$915_P$.

In block 1010, Circuit 916 measures the PAPR of each of $915_1$-$915_P$ and determines $915_p$ (1≤p≤P) has best the PAPR for the current N symbols.

In block 1012, circuit 916 outputs, as signal 907, the descriptor value used by $914_p$ for the current N symbols. Circuit 916 also initializes the filters of each of circuits $914_1$-$914_P$ to match the current state of the filter of $914_p$. In this regard, since the transmit filters have 'memory' (i.e., processing of current bits or symbols depends on previous bits or symbols), then, prior to processing the next N symbols, the filters of the P−1 paths which were not selected as best for the current N symbols need to be initialized to the condition of the filter of the path that was the selected path for the current N symbols.

In block 1014, circuit 904 generates the sequence corresponding to the descriptor received as signal 907 and outputs it as signal 905. In an example implementation, the descriptor (or some other indication of the selected sequence) may be inserted into the transmission and/or transmitted via a control channel for use by a receiver.

In block 1016, circuit 908 modulates the signal 905 onto a carrier and outputs the modulated signal onto a channel via a pulse shaping filter (e.g., a root raise cosine filter).

Figure 9B:
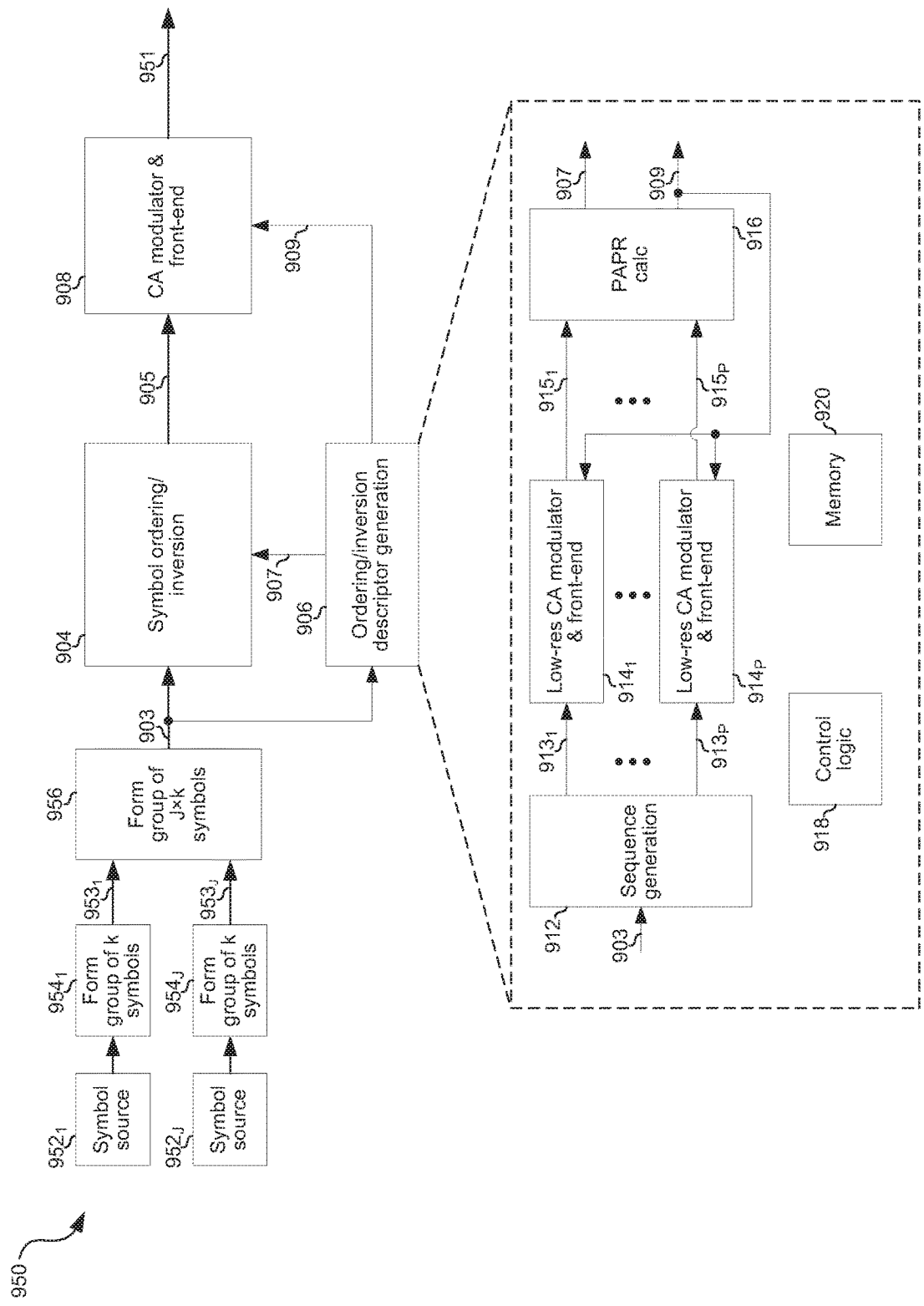
FIG. 9B is a diagram illustrating an example transmitter operable to perform peak to average power ratio (PAPR) suppression for transmissions using carrier aggregation (CA).

FIG. 9B is a diagram illustrating an example transmitter operable to perform peak to average power ratio (PAPR) suppression for transmissions using carrier aggregation (CA). FIG. 9B is similar to FIG. 9A with a few differences. First, for example, FIG. 9B makes explicit that the signal 903 may comprise a multiplexed stream of symbols from up to J (an integer) symbols sources 952 (e.g., a single SOC 102 generating multiple, separate symbols streams or multiple SoCs 102). Second, for example, FIG. 9B makes explicit that circuit 908 may use carrier aggregation for transmission of signal 951.

The sequence generation circuit 912 is operable to receive N=J×k (an integer) symbols of signal 903 and generate P (an integer between 1 and $S^N$, where S is the number of possible symbol values) sequences. The value of P for any particular implementation of transmitter 900 may be selected to balance size and power consumption and PAPR improvement (both of which increase as P increases). Each of the P sequences may be a different ordering of the N symbols, with each ordering corresponding to a particular descriptor value. Additionally, or alternatively, each of the P sequences may have a different subset of the N symbols inverted, with each combination of inverted and non-inverted symbols corresponding to a particular descriptor value. Inverting a symbol may correspond to applying a 180 degree phase shift to the symbol. In various implementations, however, a different known/deterministic phase shift may be applied to the subset of symbols that correspond to the particular descriptor to be used. In an implementation where $P<S^N$ (i.e., not every possibly sequence is tried), the P descriptor values may be chosen randomly. Alternatively, the P descriptor values may be chosen algorithmically based, for example, on characteristics of the current N symbols and/or the previous N symbols.

Each low-cost modulation and front-end circuit 913 may be a low-cost version of circuit 908. For example, each front-end circuit 913 may perform the same functions as circuit 908 but with lower resolution. As another example, each front-end circuit 913 may be structurally similar to circuit 908 but with less restrictive design and performance constraints which correspond to a lower cost component.

Figure 10B:
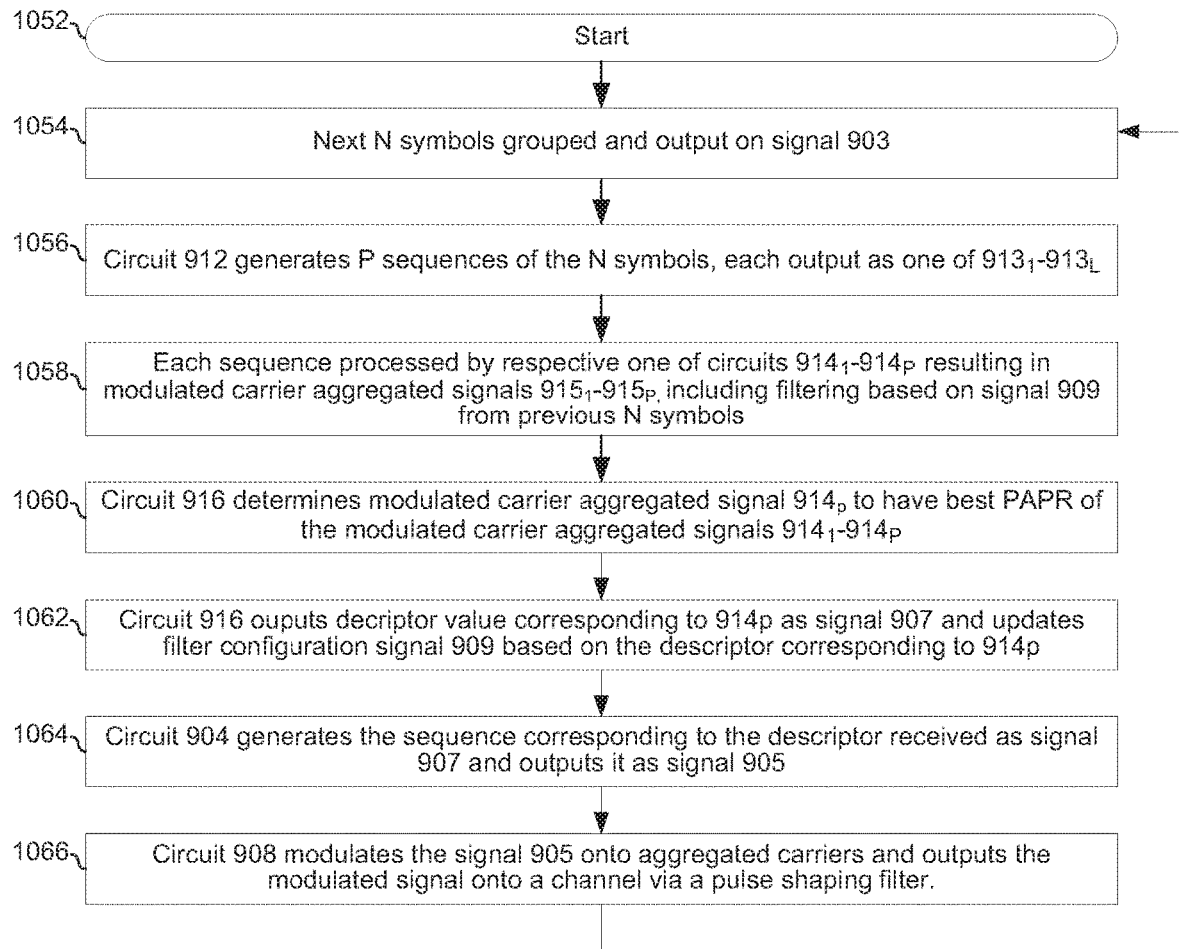
FIG. 10B is a flowchart illustrating operation of the transmitter of FIG. 9B.

Operation of the transmitter 900 is described with reference to the flowchart of FIG. 10B.

In block 1054, after start step 1052, each of circuits $954_1$-$954_J$ buffers symbols from a respective symbol source 952 until k have been buffered, and then circuit 956 combines the k symbols from each of J circuits 954 to form a group of N=J×k symbols, which are then are output as signal 903.

In block 1056, Circuit 912 generates P sequences of the N symbols, each output as one of $913_1$-$913_P$.

In block 1058, each of the sequences $913_1$-$913_P$ is processed by a respective one of circuits $914_1$-$914_P$. The processing in block 1008 may include, for example, demultiplexing the k×J symbols into J groups of k symbols, upconversion/pulse shape filtering of each of the J groups of k symbols to a respective one of J carriers/bands, and then aggregating the resulting J signals to form a respective one of modulated carrier aggregated signals $915_1$-$915_P$.

In block 1060, Circuit 916 measures the PAPR of each of $915_1$-$915_P$ and determines $915_p$ (1≤p≤P) has best the PAPR for the current N symbols.

In block 1062, circuit 916 outputs, as signal 907, the descriptor value used by $914_p$ for the current N symbols. Circuit 916 also uses signal 909 (corresponding to the selected best-PAPR signal $915_p$) to initialize (e.g., initial conditions, tap coefficients, etc.) the filters of each of circuits $914_1$-$914_P$ to match the current state of the filter of $914_p$. In this regard, since the transmit filters have 'memory' (i.e., processing of current bits or symbols depends on previous bits or symbols), then, prior to processing the next N symbols, the filters of the P−1 paths which were not selected as best for the current N symbols need to be initialized to the condition of the filter of the path that was the selected path for the current N symbols.

In block 1064, circuit 904 generates the sequence corresponding to the descriptor received as signal 907 and outputs it as signal 905. In an example implementation, the descriptor (or some other indication of the selected sequence) may be inserted into the transmission and/or transmitted via a control channel for use by a receiver.

In block 1016, circuit 908 modulates the signal 905 onto a plurality of aggregated carriers and outputs the modulated carrier aggregated signal onto a channel.

In accordance with various example implementations of this disclosure, a transmitter comprises a first peak-to-average-power ratio (PAPR) suppression circuit (e.g., 906), a second peak-to-average-power ratio (PAPR) suppression circuit (e.g., 904), and a first modulator (e.g., 908). The first PAPR suppression circuit is operable to receive a first sequence of time-domain symbols to be transmitted (e.g., as signal 903), alter the first sequence based on each of a plurality of symbol ordering and/or inversion descriptors to generate a corresponding plurality of second sequences of time-domain symbols (e.g., $913_1$-$913_P$), measure a PAPR corresponding to each of the second sequences, select one of the plurality of symbol ordering and/or inversion descriptors based on the measurement of PAPR, and convey the selected one of the symbol ordering and/or inversion descriptors to the second PAPR suppression circuit (e.g., as signal 907). The second PAPR suppression circuit may be operable to receive the first sequence of time-domain symbols to be transmitted, and alter the first sequence based on the selected one of the symbol ordering and/or inversion descriptors to generate a reordered and/or inverted symbol sequence (e.g., 905). The first modulator is operable to modulate the reordered and/or inverted sequence onto one or more carriers (e.g., resulting in signal 951). The first modulator may be a carrier aggregation modulator. The first PAPR suppression circuit may comprise a plurality of second modulators (e.g., $914_1$-$914_P$). Each of the second modulators may be operable to perform the same operations as the first modulator using lower-resolution than the first modulator. The operations performed by the modulators may comprise demuliplexing of a symbol sequence into a plurality of subsequences, and upconverting each of the plurality of subsequences to a different one of a plurality of frequency bands. The plurality of symbol ordering and/or inversion descriptors may be selected from a larger set of possible symbol ordering and/or inversion descriptors. The selection may be random or may be based on collected statistics regarding symbol ordering and/or inversion descriptors used for previous symbol sequences. The alteration of the first sequence based on the selected one of the symbol ordering and/or inversion descriptors may comprise a reordering of symbols of the first sequence and/or a phase shift of one or more symbol of the first sequence. The first sequence of time-domain symbols may comprise symbols from a plurality of symbol sources.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a first peak-to-average-power ratio (PAPR) suppression circuit, a second peak-to-average-power ratio (PAPR) suppression circuit, and a first carrier aggregation modulator, said first PAPR suppression circuit comprising a plurality of second modulators,
wherein:
said first PAPR suppression circuit is operable to:
receive a first sequence of time-domain symbols to be transmitted;
alter said first sequence to generate a plurality of second sequences of time-domain symbols;
measure a PAPR corresponding to each of said second sequences; and
convey information related to at least a portion of said measurement to said second PAPR suppression circuit;
said second PAPR suppression circuit is operable to:
receive said first sequence of time-domain symbols to be transmitted; and
alter said first sequence based on said conveyed information to generate a third symbol sequence;
said first carrier aggregation modulator is operable to modulate said third symbol sequence; and
said plurality of second modulators is operable to perform same operations as said first modulator using lower resolution than said first modulator.

2. The system of claim 1, wherein said operations comprise:
demultiplexing of a symbol sequence into a plurality of subsequences; and
upconverting each of said plurality of subsequences to a different one of a plurality of frequency bands.

3. The system of claim 1, wherein said conveyed information comprises symbol ordering and/or inversion descriptors.

4. The system of claim 1, wherein said conveyed information is selected based on a random number.

5. The system of claim 1, wherein said conveyed information is selected based on collected statistics regarding symbol descriptors used for previous symbol sequences.

6. The system of claim 1, wherein said alteration of said first sequence based on said conveyed information comprises a reordering of symbols of said first sequence and/or a phase shift of one or more symbols of said first sequence.

7. The system of claim 1, wherein said first sequence of time-domain symbols comprises symbols from a plurality of symbol sources.

8. A method comprising:
in a transmitter comprising a first peak-to-average-power ratio (PAPR) suppression circuit, a second peak-to-average-power ratio (PAPR) suppression circuit, and a first carrier aggregation modulator, said first PAPR suppression circuit comprising a plurality of second modulators:
receiving, by said first PAPR suppression circuit, a first sequence of time-domain symbols to be transmitted;
altering, by said first PAPR suppression circuit, said first sequence based on each of a plurality of symbol descriptors to generate a corresponding plurality of second sequences of time-domain symbols;
measuring, by said first PAPR suppression circuit, a PAPR corresponding to each of said second sequences;
selecting, by said first PAPR suppression circuit, one of said plurality of symbol descriptors based on said measurement of PAPR;
conveying, by said first PAPR suppression circuit, said selected one of said symbol descriptors to said second PAPR suppression circuit;
receiving, by said second PAPR suppression circuit, said first sequence of time-domain symbols to be transmitted;
altering, by said second PAPR suppression circuit, said first sequence based on said selected one of said symbol descriptors to generate a third symbol sequence
modulating, by said first carrier aggregation modulator, said third symbol sequence;
performing, by said first carrier aggregation modulator, modulation operations using a first resolution; and
performing, by each of said second modulators, said modulation operations using a second resolution that is lower than said first resolution.

9. The method of claim 8, wherein said operations comprise:
demultiplexing a symbol sequence into a plurality of subsequences; and
upconverting each of said plurality of subsequences to a different one of a plurality of frequency bands.

10. The method of claim 8, comprising selecting, by said first PAPR suppression circuit, said plurality of symbol descriptors from a set of possible symbol ordering and/or inversion descriptors.

11. The method of claim 8, wherein said selecting is random.

12. The method of claim 8, wherein said selecting is based on collected statistics regarding symbol descriptors used for previous symbol sequences.

13. The method of claim 8, wherein said altering said first sequence based on said selected one of said symbol descriptors comprises reordering symbols of said first sequence and/or phase shifting one or more symbols of said first sequence.

14. The method of claim 8, wherein said first sequence of time-domain symbols comprises symbols from a plurality of symbol sources.

* * * * *